United States Patent Office 2,833,836
Patented May 6, 1958

2,833,836

SEPARATION OF C₈ AROMATIC HYDROCARBON ISOMERS

Carl B. Linn, Riverside, Ill., assignor to Universal Oil Products Company, Des Plaines, Ill., a corporation of Delaware No Drawing. Application July 13, 1955
Serial No. 521,917

11 Claims. (Cl. 260—674)

This invention relates to an extraction process for separating and recovering the components of a $C_8$ aromatic hydrocarbon mixture, utilizing a liquid solution of a metal halide-boron trihalide complex dissolved in a liquefied hydrogen halide as the solvent extractant. More specifically, the present invention concerns a process for separating a xylene isomer from a mixture of $C_8$ aromatic hydrocarbons employing the method of countercurrent solvent extraction with a solvent comprising liquefied hydrogen halide containing in solution from 0.5 to about 20% by weight of a complex salt consisting of a halide of a metal selected from the group consisting of iron and the metals in the left-hand columns of groups IV, V, VI, and VII of the periodic table.

In one of its embodiments this invention relates to a process for separating the components of a $C_8$ aromatic hydrocarbon mixture which comprises contacting said mixture with a solution of a metal halide-boron trihalide complex salt in a liquefied hydrogen halide, said metal halide being selected from the group consisting of the halides of the metals of the iron group and of groups IV, V, VI, and VII of the periodic table, to form an extract phase containing one of the isomers of said mixture in said solvent and a raffinate phase comprising the undissolved residue of said $C_8$ aromatic hydrocarbon mixture and thereafter separating said raffinate phase from said extract phase.

A more specific embodiment of the present invention relates to a process for separating m-xylene from a mixture of $C_8$ aromatic hydrocarbon isomers which comprises countercurrently contacting said mixture of hydrocarbons with a selective solvent for said m-xylene consisting of a solution of liquefied hydrogen fluoride containing from about 5% to about 15% by weight of said solution of a boron trifluorideferrous fluoride salt complex at a temperature of from about −10° to about 100° C. and at a pressure sufficient to maintain said hydrocarbons and said solvent in substantially liquid phase, separating an extract phase comprising a major proportion of said solvent containing dissolved therein said m-xylene from a raffinate phase comprising the undissolved residue of said hydrocarbon mixture and thereafter distilling said extract phase to recover said m-xylene from said solvent.

The use of liquefied boron trifluoride and hydrogen fluoride either individually or in admixture as a solvent for particular isomers of $C_8$ aromatic hydrocarbon mixtures is well-known and on the basis of investigations of this process, it is also well-known that these solvents have certain disadvantages for the indicated separation. Thus, it is recognized that hydrogen fluoride and boron trifluoride either alone or in admixture with each other result in isomerization of the $C_8$ aromatic hydrocarbons at the usual extraction conditions to alter the ratio of isomers in the mixture undergoing extraction and therefore increase or reduce the proportion of one or more of the isomers recovered in the extraction procedure. It is also well-known that mixtures of hydrogen fluoride and boron trifluoride or either of the components individually are highly corrosive against the usual metallic equipment out of which the extraction apparatus is fabricated and the use of these solvents in such equipment therefore demands that exceptional precautions be taken to prevent or reduce the corrosion of solvent extraction equipment. In the application of the solvent composition of the present invention, however, utilizing solvents consisting of liquefied hydrogen halides containing in solution significant amounts of certain complex salts comprising a metal halide selected from the iron group metals and the metals of the left-hand columns of groups IV, V, VI, and VII of the periodic table with boron trihalides, the disadvantages associated with boron trifluoride or hydrogen fluoride individually or mixtures thereof are obviated with no sacrifice in the degree of separation and the selectivity of the extractant for the particular isomer to be recovered. Thus, substantially no corrosion of a water-free system utilizing the present solvent composition will occur. Furthermore, the relative ratio of the individual components of the $C_8$ aromatic hydrocarbon fraction subjected to extraction remains substantially the same as in the charge stock, on the basis of the total weight of extract produced and the weight of the individual components in the raffinate.

The present extractive solvent is particularly selective for the meta-isomer of a mixture of the $C_8$ aromatic hydrocarbons, that is, the extractant dissolves a greater proportion of the meta-isomer than ortho- or para-xylene or ethylbenzene. Since m-xylene is selectively removed from a mixture of the $C_8$ aromatic hydrocarbons, the ortho and para components of the mixture are also more readily separated after the meta-isomer is substantially removed from the mixture, since the spread in boiling points between the ortho- and para-isomers (being the difference between 144.4° and 138.4° C. at 760 mm. Hg pressure for the respective isomers) makes the separation between the ortho- and para-isomers feasible by ordinary distillation means. The boiling point of the meta-isomer (139.1° C.) which bridges the gap between the boiling points of ortho- and para-isomers complicates the separation of a three-component mixture by fractional distillation means. If ethylbenzene, the other $C_8$ aromatic hydrocarbon isomer, having a boiling point of 136.2° C., is present in a four-component mixture, the p-xylene isomer may be separated from the initial mixture prior to the separation of the meta-isomer from ethylbenzene by well-known separation methods, such as fractional crystallization, for example, at temperatures of about −45° C. or lower on the basis of the results obtained in solvent extraction processes with the present solvent extractant and based on the observations of its physical and chemical properties, it is believed that the solvent composition is a peculiar associaion of a boron trihalide and a metal halide in a chemical complex salt form and that the hydrogen halide present in the solvent composition also enters into the complex. This conclusion is indicated by the fact that the vapor pressures of the hydrogen halide and boron trihalide when combined in the form of the solvent composition are substantially less on the basis of their partial pressures than the vapor pressures of the individual compounds. It is believed that the solvent characteristics of the solution of metal halide, boron trihalide and hydrogen halide in the form of the complex salt dissolved in an excess of the liquid hydrogen halide is directly the consequence of the altered properties of these components when combined in the proportion herein provided for the solvent composition, aside from the solvency characteristics of the individual components of the complex or of any combination of two of the components.

Contemplated within the scope of the present invention are separations between any two or more $C_8$ aromatic hydrocarbons selected from o-xylene, m-xylene, p-xylene and ethylbenzene, utilizing a solvent consisting of a hydrogen halide solution of a complex salt formed between a metal halide selected from the fluorides, chlorides, bromides, and iodides of the iron group metals and of the metals of groups IV, V, VI, and VII of the periodic table and a boron trihalide which may be fluoride, chloride, bromide or iodide. Although the metal halide is preferably a fluoride, chloride, bromide or iodide of an iron group metal, that is, of iron, cobalt or nickel, and more desirably a fluoride, other metal halides which may be combined with the boron trihalide in the solvent composition are the fluorides, chlorides, bromides, and iodides of such preferred metals as chromium, molybdenum, tungsten, titanium, manganese, vanadium, and zirconium, the fluorides and chlorides of these metals being particularly preferred because of their generally greater availability and more desirable physical properties when combined with a boron trihalide, which is preferably boron trifluoride. In general, it is also preferred that the halogen portion of the components of the solvent composition be the same for each of the ingredients, that is, when boron trifluoride, for example, is utilized in preparing the solvent composition, it is preferable that the metal halide likewise be a metal fluoride and the hydrogen halide component be hydrogen fluoride. It is to be emphasized, however, that the halides utilized in the preparation of the solvent composition need not necessarily contain the same halogen ion and that the halides entering into the composition may be heterogeneous halides without materially affecting the physical or chemical properties of the solvent composition.

Any suitable method may be utilized in the preparation of the present solvent composition. In accordance with one convenient method of preparation, the hydrogen halide, for example, hydrogen fluoride, is reacted with the metal constituting the metal halide salt in the composition, for example, iron, the latter preferably being in its powdered form, to yield the corresponding metal halide and the latter then reacted with the boron trihalide, such as boron trifluoride to form a complex between the metal halide and boron trihalide and thereafter adding a sufficient excess of the hydrogen halide in liquid form to dissolve the previously formed complex salt. In another method of preparation, the hydrogen halide and boron trihalide in liquid form are premixed and the resulting mixture thereafter contacted with the metal which will form the desired metal halide component of the solvent composition at reaction conditions resulting in the interaction of the metal with the hydrogen halide. In either method of preparation it is desirable that an excess of the hydrogen halide be present in the reaction forming the metal halide. For most purposes, an equimolar ratio of the metal halide and the boron trihalide is sufficient to form a solvent composition of the desired solvency and selectivity characteristics, although either the metal halide or boron trihalide component may be varied within the range of 0.1 to about 10 moles of boron trihalide per mole of the metal halide, it being essential that only a sufficient amount of both the above components be present to form a substantial concentration of the metal halide-boron trihalide complex, preferably from about 1% to about 20% thereof in the total solvent composition.

The complex salt formed by the interaction of the metal halide with the boron trihalide is a solid and in preparing the solvent sufficient liquid hydrogen halide is supplied in order to substantially completely dissolve the complex therein. The complex salt which exists in the hydrogen halide solution is believed to be an association of the metal halide with the boron trihalide of the formula: $MX_2 \cdot BX_3$ wherein X is a halogen, the complex in the case of a solvent consisting of iron fluoride, boron trifluoride and hydrogen fluoride being a solid solution of a ferrous fluoride-boron trifluoride, having the following formula: $FeF_2 \cdot BF_3$. When the proportion of boron trifluoride to ferrous fluoride utilized in the preparation of the complex salt component of the solvent composition is increased, the complex contains other ratios of boron trifluoride to ferrous fluoride, forming various complexes of varying composition, depending upon the proportion of boron trifluoride therein. Similar compounds are formed in the case of other metals reacted with hydrogen fluoride and boron trifluoride and compositions of other hydrogen halides, boron trihalides, and metal halides form hydrogen halide solutions of other complex systems having various solvency and selectivity characteristics.

Solvent extraction of a $C_8$ aromatic hydrocarbon mixture is preferably effected under countercurrent solvent extraction conditions in which the hydrocarbon mixture is introduced into the lower portion of an extraction zone and the relatively more dense solvent composition of this invention introduced into the upper portion of the extraction zone, the two phases being allowed to contact each other, preferably by subdividing in droplet form one or the other of the two phases. Under such conditions a countercurrent flow relationship is set up between the two phases, the raffinate tending to accumulate in the upper portion of the extraction zone, while the extract phase comprising the solvent composition containing the soluble $C_8$ aromatic component dissolved therein gravitating toward the lower portion of the extraction zone. Under continuous methods of operation in which the feed stock and the solvent compositions are continuously introduced into their respective inlet ports, a raffinate stream is continuously removed from the raffinate outlet at the top of the extraction zone as the extract phase is continuously withdrawn from the extraction zone at the bottom of the column. The extraction is effected at a temperature below the critical temperature for the hydrogen halide solution of the metal halide-boron halide complex and preferably below the critical temperature of any individual component of the composition, for example at temperatures of from about −20° to about 50° C., the pressure at which the extraction is effected being sufficient to maintain the solvent composition and hydrocarbon charging stock in substantially liquid phase during the extraction, pressures of from about 10 to about 500 p. s. i. usually being sufficient for this purpose. The optimum solvent to hydrocarbon feed ratios supplied to the extraction zone are generally within the range of from about 0.5 to 1 to about 10 to 1 volumes of solvent per volume of hydrocarbon feed stock, although this may be varied within relatively wide limits, as desired.

Upon removal of the extract phase containing the dissolved $C_8$ aromatic hydrocarbon isomer from the extraction zone, the extracted isomer may generally be recovered from the extract phase by distillation in order to vaporize the extract hydrocarbon or a hydrocarbon-hydrogen halide azeotrope therefrom, usually by reducing the pressure on the system and introducing heat into the extract phase, with or without reflux of the vaporized portion in order to effect more complete separation of the dissolved $C_8$ isomer from the vaporized hydrogen halide. One of the preferred methods of effecting the stripping operation comprises condensing the vapor overhead from the stripping column, decanting the hydrocarbon layer separating from the condensed overhead vapors from a lower layer of liquid hydrogen halide and refluxing the liquefied hydrogen halide back to the top of the stripping column as the distillation proceeds. The recovered $C_8$ aromatic hydrocarbon isomer withdrawn from the vapor overhead condensate may be suitably washed with water, followed by a caustic wash to eliminate the dissolved hydrogen halide therefrom or alternatively, the hydrogen halide may be selectively removed by passing the decanted liquid hydrocarbon portion of the product over an adsorbent for the hydrogen halide, such as alumina, aluminum fluoride, calcium fluoride, magnesium fluoride, activated carbon etc.

In the absence of any significant quantity of water in the feed stock or solvent-extractant in the solvent stream, corrosion of ordinary steel equipment in which the process is effected is generally negligible because of the corrosion inhibiting tendency of the metal halide-boron trihalide complex in the solvent composition. For this reason, the extraction equipment may be fabricated from such common construction materials as carbon steel or, if desired, from stainless steels resistant to the action of hydrogen fluoride. Because of the desirability of maintaining corrosion at a minimum, the $C_8$ aromatic hydrocarbon feed stock to the process is preferably dried to a negligible water content prior to introducing the feed stock into the extraction zone. However, in the event that small quantities of water are accidentally introduced into the system by virtue of a feed stock containing a small amount of dissolved water, the solvent composition may be continuously dehydrated in a separate distillation column by removing a water-hydrogen halide azeotrope from the composition prior to recycling of the stripped solvent composition to the extraction zone.

The present invention is further illustrated with respect to several of its specific embodiments in the following examples, which, however, are introduced for illustrative purposes only with no intention of limiting the scope of the invention necessarily in accordance therewith.

Example I

A complex salt believed to have the formula: $FeF_2 \cdot BF_3$ is prepared in accordance with the following method: 28 grams of iron powder and 88 grams of anhydrous hydrogen fluoride are placed in a copper-lined, steel autoclave, the autoclave heated, after closing, for about ½ hour at a temperature of approximately 100° C. as the autoclave is slowly rotated, thereafter cooling the reactor and releasing the hydrogen formed during the resulting reaction. Boron trifluoride in the amount of 61 grams is then pressured into the autoclave, followed by rotating the autoclave for approximately 20 hours at 23° C. The com- a white solid, analyzing 7.6% boron and 34.5% iron, compared to a calculated analysis for $FeF_2 \cdot BF_3$ of 34.6% iron and 7.6% boron.

The resulting 4% solution of ferrous fluoride-boron trifluoride solution in hydrogen fluoride is mixed with 131 grams of $C_8$ aromatic hydrocarbon fraction containing 29% para-xylene, 44% meta-xylene, 24% ortho-xylene and 3% ethylbenzene in the above autoclave, the temperature being maintained at approximately 29° C. as the closed autoclave is rotated in order to effect mixing of the solvent and hydrocarbon phases. Approximately 6% by weight of the aromatic mixture dissolves in solvent, the unextracted, or raffinate fraction being separated from the extract phase by decantation. The extracted hydrocarbons are recovered from the extract phase by heating the extract in a stainless steel distillation column in order to vaporize the hydrocarbon components thereof from the fat solvent. The extract hydrocarbons distilled from the rich solvent phase consist of the following components in their indicated proportion by weight: para-xylene 14%, meta-xylene 74%, ortho-xylene 9% and ethylbenzene 3%. The above results indicate that meta-xylene is substantially more soluble in the solvent than the other $C_8$ aromatic isomers.

In a similar extraction procedure employing liquid anhydrous fluoride alone, that is, in the absence of a ferrous fluoride-boron trifluoride, only about 4% by weight of the $C_8$ aromatic hydrocarbon fraction is soluble in the solvent and no selectivity of the HF solvent towards the isomeric aromatic compounds is noted.

Example II

A continuous hydrocarbon extraction procedure may be set up utilizing the above 4% by weight solution of ferrous fluoride-boron trifluoride complex in anhydrous liquid hydrogen fluoride, employing a countercurrent liquid-liquid extraction system carried out in an extraction column fabricated from cast iron pipe by charging the anhydrous solvent extractant into the column on the upper plate, charging the feed stock into the column at approximately the center thereof, introducing a reflux stream into the bottom of the column, withdrawing nonextracted raffinate from the top of the column above the solvent inlet, withdrawing rich solvent or extract phase from the bottom of the column below the reflux inlet and charging the extract phase as it is formed into a stripping column comprising a still having a reboiling coil in the lower portion of the column and a vapor overhead outlet at the top of the column. The feed stock to the extraction zone is the mixture of $C_8$ aromatic hydrocarbons isomers indicated in Example I, above, which is charged into the extraction zone at a temperature of approximately 30° C., the solvent also being charged into the column at the same temperature. The extractor is operated at a pressure of 100 p. s. i., utilizing a solvent to feed stock volume ratio of 10 to 1. The reflux stream (comprising meta-xylene recovered as overhead from the stripping column) is charged into the extraction column at a point just above the rich solvent outlet and at a rate of 10 volumes per 100 volumes of $C_8$ aromatic hydrogen charge stock, the meta-xylene introduced as reflux tending to displace other $C_8$ aromatic hydrocarbons from the rich solvent stream just prior to the removal of the latter from the extraction zone during operation of the column. The solvent is continuously charged into the top of the column as lean solvent residue of the stripping zone; it contains approximately 0.5% by weight of dissolved aromatic hydrocarbons. The stripping column is operated at atmospheric pressure, the pressure reduction occurring as the fat solvent or extract phase is introduced into the column, causing flash vaporization of the dissolved aromatic hydrocarbons and a portion of the hydrogen fluoride from the fat solvent stream. The vapors are taken overhead from the stripping column and condensed to a liquid mixture, the heavier hydrogen fluoride phase being withdrawn from the receiver and returned to the top of the stripping column as reflux therein, while the upper hydrocarbon phase is removed into product storage from which the extractor reflux is withdrawn at the aforementioned rate and charged into the lower portion of the extraction column. The stripped aromatic hydrocarbon is removed from storage and fractionally distilled to remove the hydrogen fluoride therefrom which is taken overhead from the distillation column and also returned to the top of the stripping zone. The hydrocarbon residue consists of substantially pure meta-xylene free of fluorides and is produced at the rate of approximately 21 volumes of meta-xylene per 100 volumes of feed stock.

Example III

A complex comprising a chromium fluoride-boron trifluoride salt is prepared in accordance with the following procedure: 26 grams of metallic chromium powder and 55 grams of hydrogen fluoride are charged into the copper-liner of an 850 cc. rotating autoclave, followed by 48 grams of boron trifluoride which is pressured into the autoclave and the latter thereafter sealed. The autoclave and its contents are rotated at 100° C. for 1 hour, after which the autoclave is cooled, and the pressure released. The calculated quantity of $CrF_2BF_3$ is produced, as well as the theoretical quantity of hydrogen corresponding to the stoichiometric reaction product of hydrogen fluoride and chromium. The complex salt as recovered above is a green powder, soluble in water.

The above complex salt is dissolved to the extent of 4% by weight in liquid anhydrous hydrogen fluoride, mixed with ¼ of its volume of the $C_8$ aromatic hydrocarbon mixture specified in Example I above, stirred therewith in a pressure autoclave at 28° C. for 3 hours and the resulting phases recovered by decantation. The hydrocarbon mixture is soluble in the solvent to the extent of 3% by weight of the solvent and a major proportion of the dissolved hydrocarbons consist of meta-xylene.

*Example IV*

A complex salt comprising a compound of manganous bromide and boron tribromide is prepared as follows: into the copper-liner of an 850 cc. pressure autoclave is placed 20 grams of powdered manganese and 100 grams of boron tribromide. After sealing the autoclave, 70 grams of anhydrous hydrogen bromide is pressured into the autoclave and the latter heated to 100° C. for 3 hours as the autoclave is slowly rotated. After cooling, excess hydrogen bromide is released, the autoclave opened and the resulting complex manganous salt recovered.

A 3% by weight solution of manganous bromide-boron tribromide complex in hydrogen bromide is thoroughly mixed with the $C_8$ aromatic hydrocarbon fraction specified in Example I, above, charging 10 volumes of the 3% manganous complex salt in hydrogen bromide per volume of $C_8$ aromatic hydrocarbon charging stock. The meta-xylene component of the charge stock is largely removed therefrom and dissolved in the extract phase which separates when the mixture is allowed to settle after the contacting procedure. Distillation of the hydrocarbons from the solvent phase yields an impure meta-xylene fraction containing approximately 68% meta-xylene by weight which represents 78% of the meta-xylene contained in the initial hydrocarbon charging stock.

I claim as my invention:

1. A process for separating meta-xylene from a $C_8$ aromatic hydrocarbon mixture containing the same which comprises contacting said mixture with a solution of a metal halide-boron trihalide complex salt in a liquefied hydrogen halide, the metal of said metal halide being selected from the group consisting of the metals of the iron group and the metals in the left-hand columns of groups IV, V, VI, and VII of the periodic table, to form an extract phase containing meta-xylene in said solvent and a raffinate phase comprising undissolved $C_8$ aromatic hydrocarbon and thereafter separating said raffinate phase from said extract phase.

2. The process of claim 1 further characterized in that said hydrogen halide is hydrogen fluoride and said metal halide is a metal fluoride.

3. The process of claim 1 further characterized in that said metal halide is a ferrous halide.

4. The process of claim 1 further characterized in that said hydrogen halide is hydrogen fluoride, said metal halide is a metal fluoride and said boron trihalide is boron trifluoride.

5. The process of claim 4 further characterized in that said complex salt is a complex of iron fluoride, boron trifluoride and hydrogen fluoride.

6. The process of claim 1 further characterized in that said process is effected in liquid phase.

7. The process of claim 1 further characterized in that said solution contains from about 0.1 to about 20% by weight of said complex salt.

8. The process of claim 1 further characterized in that said process is effected under countercurrent flow conditions.

9. The process of claim 8 further characterized in that a reflux stream comprising extract hydrocarbon is recycled to the contacting process and charged therein below the inlet for said $C_8$ aromatic hydrocarbon mixture.

10. A process for separating meta-xylene from a mixture of $C_8$ aromatic hydrocarbons which comprises contacting said mixture with a solution of ferrous fluoride-boron trifluoride complex salt in liquefied hydrogen fluoride to form an extract phase containing said meta-xylene and a raffinate phase comprising undissolved $C_8$ aromatic hydrocarbons and thereafter separating said raffinate phase from said extract phase.

11. The process of claim 10 further characterized in that said meta-xylene is separated from said extract phase by fractional distillation.

References Cited in the file of this patent
UNITED STATES PATENTS

| 2,528,892 | Lien et al. | Nov. 7, 1950 |
| 2,639,303 | Linn et al. | May 19, 1953 |